United States Patent [19]

Shinshi

[11] Patent Number: 4,903,664
[45] Date of Patent: Feb. 27, 1990

[54] SPARK IGNITION TIMING CONTROL SYSTEM FOR INTERNAL COMBUSTION ENGINE WITH FAIL SAFE SYSTEM FOR CYLINDER PRESSURE SENSOR

[75] Inventor: Mamoru Shinshi, Kanagawa, Japan

[73] Assignee: Nissan Motor Company, Limited, Yokohama, Japan

[21] Appl. No.: 261,384

[22] Filed: Oct. 24, 1988

[30] Foreign Application Priority Data

Oct. 22, 1987 [JP] Japan .................. 62-265342

[51] Int. Cl.⁴ .............................................. F02P 5/15
[52] U.S. Cl. ............................. 123/425; 364/431.08
[58] Field of Search ....................... 123/425, 435; 364/431.08

[56] References Cited

U.S. PATENT DOCUMENTS

| | | | |
|---|---|---|---|
| 4,690,116 | 9/1987 | Takahashi | 364/431.08 |
| 4,693,221 | 9/1987 | Nakajima et al. | 364/431.08 |
| 4,750,103 | 6/1988 | Abo et al. | 123/425 |
| 4,819,171 | 4/1989 | Morita | 364/431.08 |
| 4,821,194 | 4/1989 | Kawamura | 364/431.08 |
| 4,825,832 | 5/1989 | Satoh et al. | 123/435 |

FOREIGN PATENT DOCUMENTS 62-34028  2/1987  Japan .

Primary Examiner—Tony M. Argenbright
Assistant Examiner—Robert Mates
Attorney, Agent, or Firm—Foley & Lardner, Schwartz, Jeffery, Schwaab, Mack, Blumenthal & Evans

[57] ABSTRACT

A fail safe system for a cylinder pressure sensor is used for a spark ignition timing control system which calculates a physical quantity for combustion energy within the combustion chamber of an engine cylinder of an internal combustion engine and corrects the spark ignition timing on the basis of the physical quantity. The fail safe system sets a running average of a statistical dispersion of the physical quantity to a predetermined greater value when a specific driving condition, i.e. a high engine load and high engine speed condition is initially determined, and thereafter compares the running average with a predetermined value when the specific driving condition is detected again to detect abnormality of the cylinder pressure sensor.

10 Claims, 2 Drawing Sheets

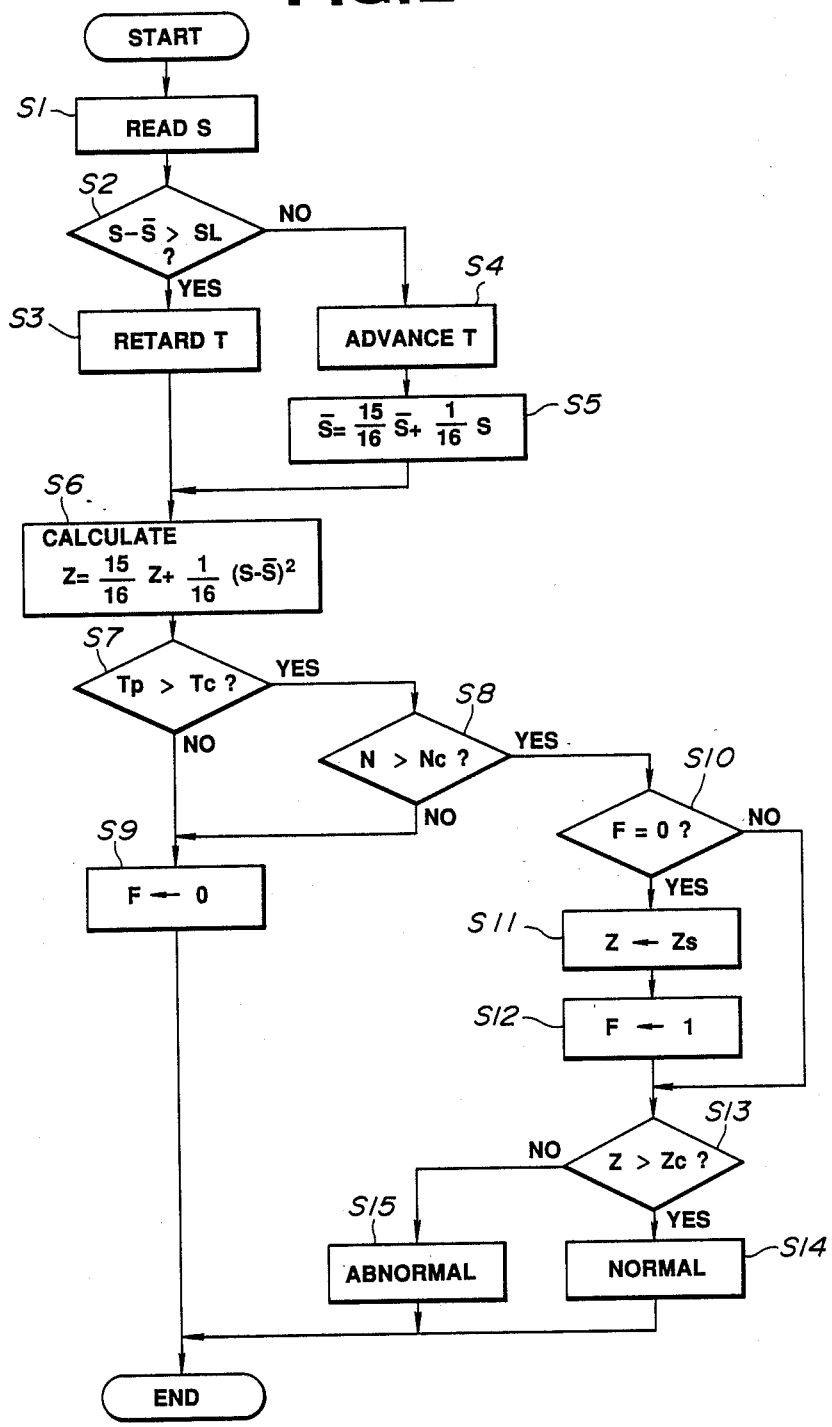

SPARK IGNITION TIMING CONTROL SYSTEM FOR INTERNAL COMBUSTION ENGINE WITH FAIL SAFE SYSTEM FOR CYLINDER PRESSURE SENSOR

BACKGROUND OF THE INVENTION

1. Field of the Invention

The present invention relates generally to a spark ignition timing control system for an internal combustion engine, such as an automotive internal combustion engine. More specifically, the invention relates to a spark ignition timing control system with a fail safe system for a cylinder pressure sensor which monitors fluctuation in pressure within the combustion chamber of an engine cylinder of the internal combustion engine. Further particularly, the invention relates to a fail safe system for a cylinder pressure sensor used for detecting and controlling knocking in the internal combustion engine, on the basis of the fluctuation in pressure within the combustion chamber.

2. Description of the Prior Art

In order to monitor fluctuation in pressure within a combustion chamber of an engine cylinder, which will be referred to as "cylinder pressure", a cylinder pressure sensor made of a piezoelectric ceramic has been used. A signal produced by the cylinder pressure sensor is processed by means of a band-pass filter after performing its charge/voltage conversion, and then rectified. Thereafter, the rectified signal is integrated within a predetermined range every combustion cycle of each of the engine cylinders, so that a physical quantity S for combustion energy within a combustion chamber of the engine cylinder every combustion cycle can be obtained. Therefore, after a running average $\bar{S}$ of the obtained physical quantity S is calculated, knocking in the internal combustion engine can be detected by comparing a deviation $S-\bar{S}$ with a predetermined value SL. That is, when the deviation $S-\bar{S}$ is greater than the value SL, it can be assumed that knocking is occuring in the internal combustion engine, in which case the spark ignition timing is so controlled as to be retarded. On the other hand, when the deviation $S-\bar{S}$ is smaller than the value SL, it can be assumed that no knocking is occuring in the internal combustion engine, and the spark ignition timing is so controlled as to be advanced.

In the case of controlling the spark ignition timing on the basis of detected knocking, it is required for reliable data to be outputted from the cylinder pressure sensor. Therefore, when the cylinder pressure sensor is abnormal, or malfunction occurs in the cylinder pressure sensor, it is required for this to be detected.

Knocking in the engine cylinder is a proability phenomenon, and the aforementioned physical quantity S represents a predetermined dispersion in normal conditions. From this point of view, the Japanese Patent First (unexamined) Publication Showa No. 62-34028 discloses a spark ignition timing control system in which whether or not the cylinder pressure sensor is abnormal is determined, and the spark ignition timing is appropriately corrected if the sensor is abnormal.

In the aforementioned system, a statistical dispersion $(S-\bar{S})^2$ of the physical quantity S is calculated, and then a running average Z of this dispersion is calculated by, for example, the following equation, each combustion cycle.

$$Z = (15/16)Z + (1/16)(S-\bar{S})^2$$

Thereafter, under specific sets of driving conditions, e.g. high load or high engine speed and high load, the running average of the dispersion Z is compared with a predetermined value. When the running average Z is greater than the predetermined value, it is assumed that normal combustion is occuring in the engine cylinder. On the other hand, when the running average Z is smaller than the predetermined value, it is assumed that abnormal combustion is occuring therein, and fail safe processing, e.g. retardation of the spark ignition timing, is performed. For example, under low load conditions, little knocking occurs, so that the physical quantity S is very small, therefore the dispersion Z is small. Therefore, the conditions under which determination is made as to whether or not combustion in the engine cylinder is abnormal, are limited to the aforementioned specific sets of conditions.

However, in such a conventional knocking detection system, under the specific driving conditions, wherein in functioning condition of the sensor is detected, the running average is obtained by continuously updating the running average of the dispersion. Therefore, during a short period immediately after a driving conditions changes from one having a small dispersion into one of the specific driving conditions, the calculated running average is small.

Under certain running conditions, it is assumed that a certain threshold dispersion must be encountered. If that threshold value is not reached, then it is assumed that the sensor is broken. Therefore, when the running condition of the engine changes from one having a very low dispersion to one having a high dispersion, the running avarage remains low for a short period. SInce the running average of the dispersion appears to be too low for the running condition of the engine, the CPU of the system erroneously assumes that the sensor has broken and goes to fail safe mode.

SUMMARY OF THE INVENTION

It is therefore a principal object of the present invention to eliminate the aforementioned disadvantages and to provide a spark ignition timing correction system with a fail safe system which can accurately determine whether or not a cylinder pressure sensor is abnormal.

It is another object of the invention to provide a spark ignition timing correction system with a fail safe system which can prevent a mistaken determination immediately after driving condition changes one having a small dispersion into the one of specific driving conditions.

In order to accomplish the aforementioned and other specific objects, a fail system for a cylinder pressure sensor, according to the present invention, includes means for setting a running average of a statistical dispersion of the physical quantity to a predetermined greater value when a specific driving condition is initially detected, and for comparing the running average with a predetermined value when the specific driving condition is detected again to detect abnormality of the cylinder pressure sensor.

According to one aspect of the present invention, a fail safe system for a cylinder pressure sensor used for a spark ignition timing control system which calculates a physical quantity for combustion energy within the combustion chamber of an engine cylinder of an internal combustion engine and corrects the spark ignition timing on the basis of the physical quantity, comprises:

first means for calculating a running average of a statistical dispersion of the physical quantity;

second means for detecting a specific driving condition of the internal combustion engine;

third means for setting the running average to be a first value so as to make the running average larger when the specific driving condition is initially detected; and fourth means for comparing the running average with a second value when the specific driving condition is detected, and for detecting abnormality of the cylinder pressure sensor.

The specific driving condition is preferably a condition in which the engine load is greater than a third value and the engine speed is greater than a fourth value. The fourth means may determine that the cylinder pressure sensor is abnormal when the running average is greater than the second value, and that the cylinder pressure sensor is normal when the running average is less than the second value. The fail safe system may further comprise fifth means for causing the spark ignition timing control system to control the spark ignition timing to be retarded when the forth means determines that the cylinder pressure sensor is abnormal.

According to another aspect of the invention, a spark ignition timing correction system comprises:

sensor means for monitoring fluctuation in pressure within the combustion chamber of an engine cylinder of an internal combustion engine and for producing a sensor signal indicative of the fluctuation;

first means for calculating a physical quantity for combustion energy within the combustion chamber on the basis of the sensor signal;

second means for calculating a deviation which is equal to a difference between the physical quantity and a running average thereof, and for comparing the deviation with a first value;

third means for correcting the spark ignition timing so as to be retarded when the deviation is greater than the first value, and to be advanced when the deviation is less than the first value;

fourth means for calculating a running average of the deviation;

fifth means for detecting a specific driving condition of the internal combustion engine;

sixth means for setting the running average to be a second value so as to make the running average larger when the specific driving condition is initially detected; and seventh means for comparing the running average with a third value while the specific driving condition is detected, and for detecting abnormality of the sensor means.

The specific driving condition is preferably a condition in which the engine load is greater than a fourth value and the engine speed is greater than a fifth value. The fifth means may determine the engine load on the basis of a basic fuel injection pulse width, which is calculated on the basis of signals produced from an air flow meter and a crank angle sensor. The fifth means ay determine the engine speed on the basis of a signal produced from a crank angle sensor. The seventh means may determine that the sensor means is abnormal when the running average is greater than the second value, and that the sensor means is normal when the running average is less than the second value. The spark ignition timing correction system may further comprise eighth means for correcting the spark ignition timing to be retarded when the seventh means determines that the sensor means is abnormal.

BRIEF DESCRIPTION OF THE DRAWINGS

FIG. 2 is a flowchart of a program for controlling a spark ignition timing correction system according to the present invention.

DESCRIPTION OF THE PREFERRED EMBODIMENT

Figure 1:
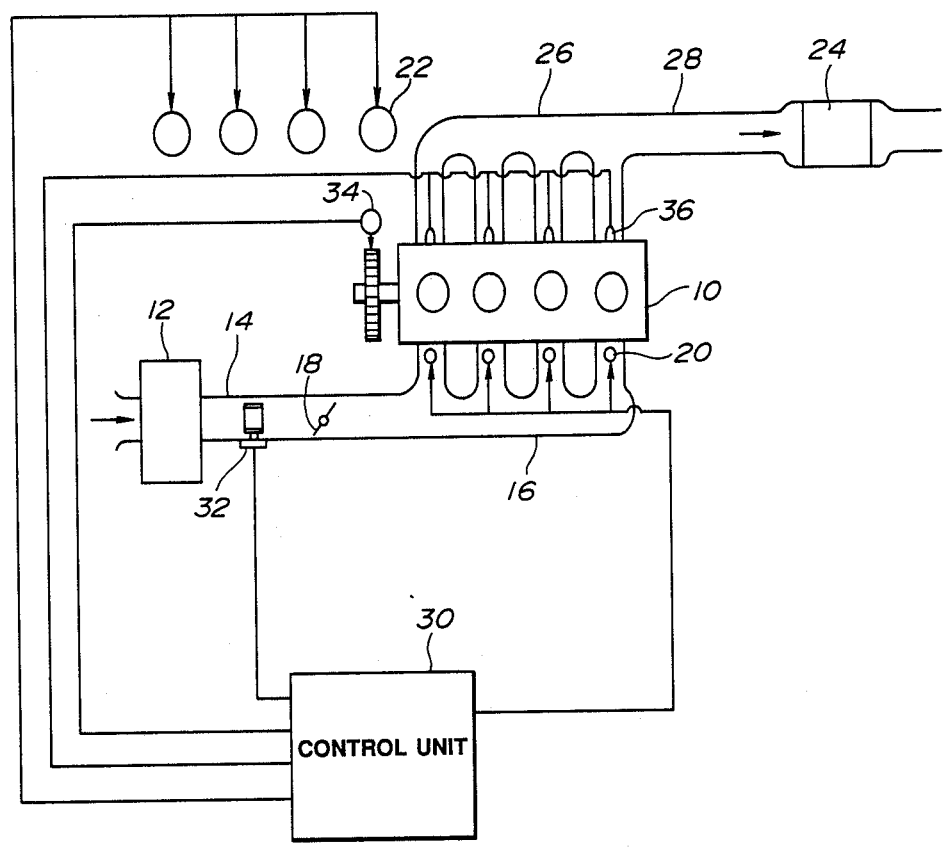
FIG. 1 is a schematic block diagram of a spark ignition timing correction system for an internal combustion engine, according to the present invention.

Referring now to the drawings, particularly to FIG. 1, the preferred embodiment of a spark ignition timing correction system, according to the present invention, is specifically adapted for a spark ignition control system for an internal combustion engine 10. The internal cobustion engine 10 has an air induction system including an air cleaner 12, an induction pipe 14 and an intake manifold 16. A throttle valve 18 is disposed within a throttle chamber between the induction pipe 14 and the intake manifold 16 to adjust air path area depending upon orientation of an accelerator pedal not shown.

A plurality of fuel injection valves 20 is provided for injecting fuel into the air induction system for forming an air/fuel mixture to be burned in combustion chambers defined in each engine cylinder. In order to perform fuel injection for each engine cylinder independently of that for other cylinders, each fuel injection valve 20 is directed into a corresponding one of the branch passage of the intake manifold 16. The fuel injection valve 20 incorporates an electromagnetic actuator not shown for driving the fuel injection valve between open and closed positions. As is well known, the electromagnetic actuator is responsive to a HIGH level fuel injection pulse to open for injecting fuel and to close whiel the fuel injection signal is LOW level. The open period of the fuel injection valve 20 is thus determined according to the duration of the HIGH level fuel injection pulse.

Each of the engine cylinders is provided with an ignition plug not shown which is responsive to a high voltage produced by an ignition coil 22 to cause ignition of the air/fuel mixture in each of the engine cylinders.

The internal combustion engine 10 is in communication with a catalytic converter 24 via an exhaust manifold 26 and an exhaust pipe 28, so that an exhaust gas passes through the exhaust manifold 26 and the exhaust pipe 28 to be purified by means of the catalytic converter 24 and exhausted outside.

In order to control the open period of the fuel injection valve 20 and the spark ignition timing, the fuel injection valve 20 and the ignition coil 22 are connected to a control unit 30 which is connected to an air flow meter 32, a crank angle sensor 34, a cylinder pressure sensor 36 and so forth.

A process for controlling the open period of the fuel injection valve 20 is briefly described below.

First, from the engine load Q, which is determined on the basis of a signal produced by the air flow meter 32, and the engine speed N which is determined on the basis of a signal produced by the crank angle sensor 34, a basic fuel injection pulse width $Tp$ ($=K \times Q/N$, K: constant) is calculated. By correcting the basic fuel injection pulse width $Tp$, a fuel injectionpulse width $Ti$ ($=Tp \times COEF+Ts$, COEF: correction factor, Ts: correction factor for voltage) is obtained. A driving pulse signal having a pulse width which corresponds to the fuel injection pulse width Ti is outputted to the fuel injection valve 20, so that the open period thereof is determined.

A process for controlling the spark ignition timing is briefly described below.

First, making reference to a map, a basic spark ignition timing is determined from the engine speed N and the basic fuel injection pulse width Tp. Next, on the basis of a signal produced by the cylinder pressure sensor 36, it is determined whether or not knocking is occuring in the internal combustion engine. When it is determined that knocking is occuring in the internal combustion engine, the basic spark ignition timing is so corrected as to be retarded. On the other hand, when it is determined that no knocking is occuring therein, the basic spark ignition timing is so corrected as to be advanced. Thus, the spark ignition timing is obtained. At this timing, an ignition signal is produced so that the ignition coil is active.

A process for detecting and controlling knocking will be described below.

The cylinder pressure sensor 36 is made of an annular piezoelectric ceramic, and is used as a mounting washer of the ignition plug for each of the engine cylinders. The cylinder pressure sensor 36 produces a electrical signal indicative of the cylinder pressure. The signal is amplified by means of a signal processing circuit incorporated in the control unit 30 and then processed by means of a band-pass filter to be rectified. Thereafter, the rectified signal is integrated within a predetermined range every one combustion cycle of each of engine cylinders, so that a physical quantity S, which will be referred to as "knocking intensity", for combustion energy within combustion chamber of the engine cylinder during every combustion cycle is obtained and is inputted into a microcomputer incorporated in the controller unit 30.

In order to detect knocking in the internal combustion engine 10 and abnormality of the cylinder pressure sensor 36, the microcomputer of the control unit 30 performs calculations according to the routine shown in FIG. 2 which is executed every combustion cycle.

Immediately after starting execution of the routine of FIG. 2, knocking intensity S is read at step 1. At step 2, a deviation $S-\bar{S}$ is calculated and compared with a predetermined value SL. The value $\bar{S}$ is a running average of the knocking intensity S which is obtained by a process which will be disclosed hereafter.

When the deviation $S-\bar{S}$ is greater than the value SL, it is assumed that knocking is occuring in the internal combustion engine, and the process goes to step 3 in which the spark ignition timing is so corrected as to be retarded.

On the other hand, when the deviation $S-\bar{S}$ is smaller than the value SL, it is assumed that no knocking is occuring in the internal combustion engine, and the process goes to step 4 in which the spark ignition timing is so corrected as to be advanced. Then, at step 5, the running average $\bar{S}$ of the knocking intensity S is calculated according to the following equation.

$$\bar{S}=(15/16)\bar{S}+(1/16)S$$

in which the weighting coefficient can be selected. The reason for deriving the running average $\bar{S}$ of the knocking intensity S only in cases where no knocking occuring, is that, if the greater knocking intensity S is added to the data which is used for calculation of the running average, the running average $\bar{S}$ becomes excessively large, with the result that normal knocking can not be detected.

After the processes at steps 3 and 5, the process goes to step 6. In and after the step 6, whether or not the cylinder pressure sensor is normal is determined.

At the step 6, a dispersion $(S-\bar{S})^2$ of the knocking intensity S is calculated, and the running average Z of the dispersion $(S-\bar{S})^2$ is calculated according to the following equation.

$$Z=(15/16)Z+(1/16)(S-\bar{S})^2$$

After the step 6, the basic fuel injection pulse width Tp is compared with a predetermined value Tc at step 7. By comparing the fuel injection pulse width Tp with the predetermined value Tc, it is determined that whether or not the vehicle is driving under the specific driving condition, i.e. high engine speed and high load condition. When the basic fuel injection pulse width Tp is less than the predetermined value Tc, i.e. when the vehicular driving condition is not the specific driving condition, the process goes to step 9. On the other hand, when the basic fuel injection pulse width Tp is greater than the predetermined value Tc, the process goes to step 8 in which the engine speed N is compared with a predetermined value Nc for discriminating whether or not the vehicle is driving under the specific driving condition. When the engine speed N is less than the predetermined value Nc, i.e. when the vehicular driving condition is not the specific driving condition, the process goes to the step 9.

At the step 9, the flag is reset to zero indicating there is not abnormality in the cylinder pressure sensor, and the routine is finished.

At the step 8, when it is determined that the engine speed N is greater than the predetermined value Nc, i.e. when it is determined that the vehicle is driving under the specific driving condition, the process goes to step 10 in which it is determined that the flag is zero. When the vehicle driving condition initially becomes the specific driving condition, the flag becomes zero. When the flag is zero, the process goes to step 11 in which the running average Z of the dispersion of the knocking intensity is set to be a specific greater value Zs. Alternatively, a specific value may be added to current running average Z. That is, at the step 11, the running average can be initialized. After the process of the step 11, the process goes to step 12 in which the flag is set to be 1. When the flag is 1 initially, the steps 11 and 12 are not executed. Then, at step 13, the running average Z of the dispersion of the knocking intensity is compared with a predetermined value Zc, so as to determine whether or not the cylinder pressure sensor 36 is abnormal.

When the running average Z is greater than the predetermined value Zc, the process goes to step 14 in which it is determined that the cylinder pressure sensor 36 is normal. On the other hand, when the running average Z is less than the predetermined value Zc, the process goes to stop 15 in which it is determined that the cylinder pressure sensor 36 is functioning abnormally. When it is determined that the cylinder pressure sensor 36 is abnormal, fuel safe processing is performed, such as retarding the spark ignition timing.

As set forth above, according to the present invention, in cases where abnormality of the cylinder pressure-sensor is detected on the basis of the running average of the dispersion of the knocking intensity, when the vehicle driving condition initially becomes a particular, specific driving condition in which determination of abnormality of the cylinder pressure sensor is performed, a specific greater value is added to the previous running average so that the running average is initialized. Therefore, it is possible to prevent errors in the detection of abnormality of the cylinder pressure sensor.

What is claimed is:

1. A fail safe system for a cylinder pressure sensor used for a spark ignition timing control system which calculates a physical quantity for combustion energy within the combustion chamber of an engine cylinder of an internal combustion engine and corrects the spark ignition timing on the basis of said physical quantity, said fail safe system comprising:

first means for calculating a running average of a statistical dispersion of said physical quantity;

second means for detecting a specific driving condition of said internal combustion engine;

third means for setting said running average to be a first value so as to make said running average larger when said specific driving condition is initially detected; and fourth means for comparing said running average with a second value when said specific driving condition is detected, and for detecting abnormality of said cylinder pressure sensor.

2. A fail safe system as set forth in claim 1, wherein said specific driving condition is a condition in which the engine load is greater than a third value and the engine speed is greater than a fourth value.

3. A fail safe system as set forth in claim 1, wherein said fourth means determines that said cylinder pressure sensor is abnormal when said running average is greater than said second value, and that said cylinder pressure sensor is normal when said running average is less than said second value.

4. A fail safe system as set forth in claim 3, which further comprises fifth means for causing said spark ignition timing control system to control the spark ignition timing to be retarded when said forth means determines that said cylinder pressure sensor is abnormal.

5. A spark ignition timing correction system comprising:

sensor means for monitoring fluctuation in pressure within the combustion chamber of an engine cylinder of an internal combustion engine and for producing a sensor signal indicative of said fluctuation;

first means for calculating a physical quantity for combustion energy within the combustion chamber on the basis of said sensor signal;

second means for calculating a deviation which is equal to a difference between said physical quantity and a running average thereof, and for comparing said deviation with a first value;

third means for correcting the spark ignition timing so as to be retarded when said deviation is greater than said first value, and to be advanced when said deviation is less than said first value;

fourth means for calculating a running average of said deviation;

fifth means for detecting a specific driving condition of said internal combustion engine;

sixth means for setting said running average to be a second value so as to make said running average larger when said specific driving condition is initially detected; and seventh means for comparing said running average with a third value while said specific driving condition is detected, and for detecting abnormality of said sensor means.

6. A spark ignition timing correction system as set forth in claim 5, wherein said specific driving condition is a condition in which the engine load is greater than a fourth value and the engine speed is greater than a fifth value.

7. A spark ignition timing correction system as set forth in claim 6, wherein fifth means determines said engine load on the basis of a basic fuel injection pulse width, which is calculated on the basis of signals produced from an air flow meter and a crank angle sensor.

8. A spark ignition timing correction system as set forth in claim 6, wherein fifth means determines said engine speed on the basis of a signal produced from a crank angle sensor.

9. A spark ignition timing correction system as set forth in claim 5, wherein said seventh means determines that said sensor means is abnormal when said running average is greater than said second value, and that said sensor means is normal when said running average is less than said second value.

10. A spark ignition timing correction system as set forth in claim 9, which further comprises eighth means for correcting the spark ignition timing to be retarded when said seventh means determines that said sensor means is abnormal.

* * * * *